United States Patent
Dinter et al.

(10) Patent No.: US 8,784,252 B2
(45) Date of Patent: Jul. 22, 2014

(54) DRIVE SYSTEM FOR A WIND TURBINE

(75) Inventors: Ralf Martin Dinter, Gelsenkirchen (DE); Arno Klein-Hitpass, Aachen (DE); Jan-Dirk Reimers, Aachen (DE)

(73) Assignee: Siemens Aktiengesellschaft, München (DE)

( * ) Notice: Subject to any disclaimer, the term of this patent is extended or adjusted under 35 U.S.C. 154(b) by 79 days.

(21) Appl. No.: 13/537,635

(22) Filed: Jun. 29, 2012

(65) Prior Publication Data

US 2013/0172141 A1 Jul. 4, 2013

(30) Foreign Application Priority Data

Jun. 30, 2011 (EP) .................................. 11172095

(51) Int. Cl.
*F16H 48/06* (2006.01)

(52) U.S. Cl.
USPC ........................................................ 475/149

(58) Field of Classification Search
USPC .................... 475/149, 150, 331, 5; 74/606 R; 416/170 R, 171; 290/1 C, 55
See application file for complete search history.

(56) References Cited

U.S. PATENT DOCUMENTS

| | | | |
|---|---|---|---|
| 6,232,673 B1 | 5/2001 | Schoo et al. | |
| 7,759,815 B2 | 7/2010 | Christensen | |
| 7,935,020 B2 | 5/2011 | Jansen et al. | |
| 8,008,798 B2 | 8/2011 | Jansen et al. | |
| 8,075,442 B2 | 12/2011 | Ciszak et al. | |
| 8,128,525 B2 | 3/2012 | Dinter et al. | |
| 8,376,708 B2 * | 2/2013 | Patel et al. | 416/169 R |
| 2010/0007151 A1 | 1/2010 | Ciszak et al. | |
| 2010/0160104 A1 | 6/2010 | Dinter et al. | |
| 2010/0230520 A1 | 9/2010 | Brammer et al. | |
| 2011/0068645 A1 | 3/2011 | Pötter et al. | |
| 2012/0032450 A1 * | 2/2012 | Paweletz et al. | 290/1 C |
| 2012/0074700 A1 * | 3/2012 | Ciszak et al. | 290/44 |

FOREIGN PATENT DOCUMENTS

| | | |
|---|---|---|
| EP | 1 045 139 A2 | 10/2000 |
| EP | 1 5772551 A2 | 9/2005 |
| EP | 2 031 273 A2 | 3/2009 |
| EP | 2 199 607 A2 | 6/2010 |
| EP | 2 295 147 A1 | 3/2011 |
| EP | 2 339 176 A2 | 6/2011 |
| EP | 2 372 148 A1 | 10/2011 |
| WO | WO2006/066686 A1 | 6/2006 |
| WO | WO 2008/031694 A1 | 3/2008 |
| WO | WO 2010/027618 A2 | 3/2010 |
| WO | WO 2011/051369 A2 | 5/2011 |

* cited by examiner

*Primary Examiner* — David D Le
*Assistant Examiner* — David J Hlavka
(74) *Attorney, Agent, or Firm* — Henry M. Feiereisen LLC

(57) ABSTRACT

A drive system for a wind turbine includes a transmission unit with a planet wheel stage. A coupling flange on a first shaft of the transmission unit can be connected to a driven machine shaft or rotor shaft which is mounted above a planet carrier. The transmission unit and a motor/generator unit connected with a second shaft of the transmission unit are enclosed by a gear case. A rotor of the motor/generator unit is connected to a hollow rotor shaft which surrounds an end section of the second shaft and is connected to the end section via an interior coupling or clamping connection. A connecting-piece is arranged between the transmission unit and the motor/generator unit, and concentrically surrounds a transmission-side end section of the rotor shaft, forming a bearing seat for the rotor shaft, which also supports the second shaft of the transmission unit.

40 Claims, 6 Drawing Sheets

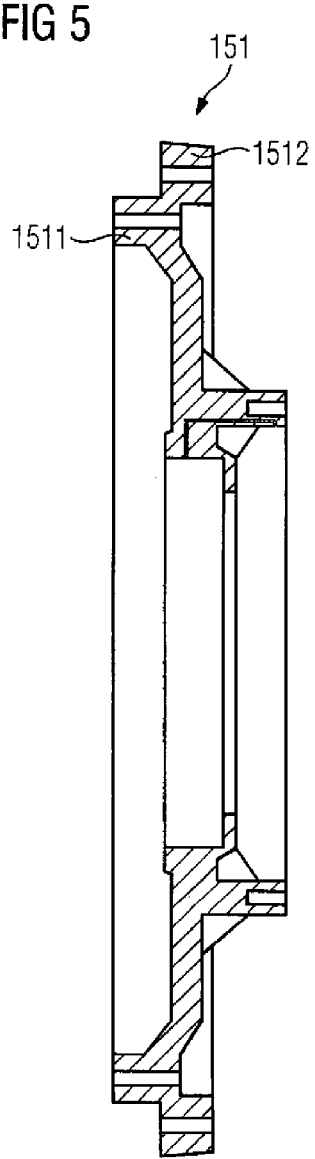
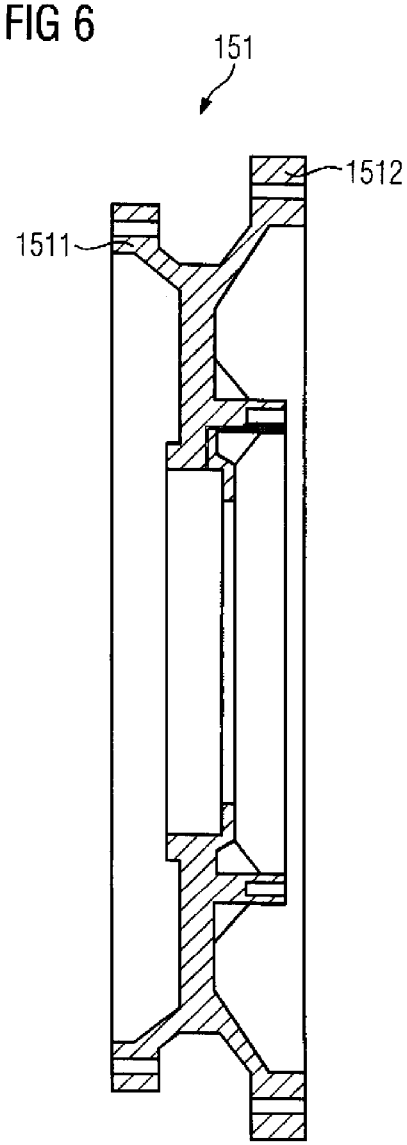

DRIVE SYSTEM FOR A WIND TURBINE

CROSS-REFERENCES TO RELATED APPLICATIONS

This application claims the priority of European Patent Application, Application Serial No. EP11172095, filed Jun. 30, 2011, pursuant to 35 U.S.C. 119(a)-(d), the content of which is incorporated herein by reference in its entirety as if fully set forth herein.

BACKGROUND OF THE INVENTION

The present invention relates to a drive system for a wind turbine.

The following discussion of related art is provided to assist the reader in understanding the advantages of the invention, and is not to be construed as an admission that this related art is prior art to this invention.

A heavy machine drive train for wind turbines or windmills normally includes system components, such as power link elements, motors and/or generators, couplings, gear units and drive shafts. Converters are often provided line-side. Brakes are often provided in the form of mechanical brakes on a fast-running shaft between gear unit and motor and/or generator, as braking torques are smaller there because of the gear ratio.

It would therefore be desirable and advantageous to provide a drive system for a wind turbine that is compact and easy to maintain.

SUMMARY OF THE INVENTION

According to one aspect of the present invention, a. drive system for wind turbines has a transmission unit with at least one planet wheel stage which has a hollow wheel, several planet wheels, a planet carrier and a sun wheel. Furthermore, a first shaft associated with the transmission unit is provided, which has a coupling flange that can be connected to a driven machine shaft or rotor shaft and that is mounted above the planet carrier. The transmission unit and a motor unit or generator unit connected to a second shaft of the transmission unit are surrounded by a gear case. Additionally, the motor unit or generator unit comprises a rotor connected in rotationally fixed manner to a hollow rotor shaft. A motor-side or generator-side end section of the second shaft of the transmission unit is concentrically surrounded by the hollow rotor shaft and is connected thereto via a coupling or clamping connection arranged inside the hollow rotor shaft. A gear-case-connecting-piece which concentrically surrounds a transmission-side end section of the hollow rotor shaft and forms a bearing seat for a bearing arrangement associated with the hollow rotor shaft is arranged between transmission unit and motor unit or generator unit. The second shaft of the transmission unit is also mounted by this bearing arrangement. The inventive drive system thereby has a very compact design and permits an embodiment of a generator/motor transmission unit which is easy to install and has an optimum weight.

According to an advantageous feature of the present invention, the hollow rotor shaft and the second shaft of the transmission unit may be mounted on the gear-case-connecting-piece exclusively by the bearing arrangement. This permits an especially compact and easy to maintain design.

According to another advantageous feature of the present invention, the hollow rotor shaft may be connected to the second shaft of the transmission unit for example by a gear coupling with involute or bevel gears. Alternatively, the hollow rotor shaft may be connected to the second shaft of the transmission unit by an internal clamping set. The internal clamping set may here each include, for example, at least one outer ring and at least one inner ring which have conical contact surfaces corresponding to one another and may be braced against one another by several axially extending clamping bolts.

According to another advantageous feature of the present invention, the at least one outer ring and the at least one inner ring both the second shaft of the transmission unit and the hollow rotor shaft as well as the hollow rotor shaft and the rotor of the motor unit or generator unit may be connected to one another by bracing which facilitates assembly. Alternatively to a gear coupling or an internal clamping set, the hollow rotor shaft may be connected to the second shaft of the transmission unit by an external clamping set.

According to another advantageous feature of the present invention, the coupling or clamping connection and the rotor of the motor unit or generator unit may be aligned axially relative to one another and merely have a radial distance from one another. According to another advantageous embodiment of the present invention, one half of the second shaft of the transmission unit may be axially surrounded by the hollow rotor shaft. In this way, the bearing arrangement of the hollow rotor shaft may be arranged axially centrally between the coupling or clamping connection and a sun wheel connected in rotationally fixed manner to the second shaft of the transmission unit so as to evenly distribute the flux of force. According to another advantageous feature of the present invention, the coupling or clamping connection may be arranged axially between the rotor of the motor unit or generator unit and the bearing arrangement of the hollow rotor shaft. This second shaft of the transmission unit can then be quite short for an even more compact design.

According to another advantageous feature of the present invention, the bearing arrangement of the hollow rotor shaft on the gear-case-connecting-piece includes a double-row bearing in an X-configuration. The hollow rotor shaft may then be manufactured without a shaft nut, since the hollow rotor shaft need not be used for setting the bearing clearance. This may instead be implemented by using an external bearing cover.

According to another advantageous feature of the present invention, the gear-case-connecting-piece may be integrally formed onto a housing adapter flange arranged between transmission unit and motor unit or generator unit. In this case, the housing adapter flange may have a bearing seat for a motor-side or generator-side planet carrier bearing. Additionally, a stator housing of the motor unit or generator unit as well as a hollow wheel of a motor-side or generator-side planet wheel stage may be mounted in particular on the housing adapter flange. In addition, each housing adapter flange may have a flange extension, on which the corresponding stator housing or the hollow wheel of the motor-side or generator-side planet wheel stage may be mounted. Advantageously, both flange extensions may have a graduated diameter and be of comparable size, with the flange extension for the stator housing being the larger of the two. For a weight-optimized design, the flange extension for the hollow wheel of the motor-side or generator-side planet wheel stage may be aligned interiorly and bolted against the housing adapter flange. According to a further embodiment of the present invention the flange extension associated with the stator housing and the flange extension associated with the hollow wheel are spaced apart axially from one another.

According to another advantageous feature of the present invention, the coupling flange may be connected flexibly to the driven machine shaft or rotor shaft. This enables a cardanic coupling of a driven machine or rotor shaft, in particular with an angular offset. Such a coupling may be implemented, for example, with elastic bolts. Advantageously, the gear case may also have a cardanic circumferentially symmetrical or partially symmetrical suspension for connection to a structural support element of the wind turbine. The structural support element may, for example, be a foundation bearing with a link to a frame or a nacelle of the wind turbine. Effects that damage bearings or gears may be eliminated with a dual or full cardanic suspension of the drive system inside the structural support element and with a cardanic link of the coupling flange. Displacements in foundation supports, which are caused by mainframe deformations of a wind turbine and which in accordance with previous solutions may be coupled into the drive train via a suspension of the drive train, therefore do not cause undesired constraining forces, but are instead eliminated with the cardanic suspension. The drive system is then merely subjected to torsion stresses.

When using the inventive drive system in a wind turbine, the transmission unit is connected to a generator unit. Furthermore, the first shaft of the transmission unit is then a transmission-side drive shaft. Conversely, the second shaft of the generator unit is a transmission-side output shaft. When the inventive drive system is used in a wind turbine, the coupling flange of the transmission-side drive shaft may be connected to a rotor shaft.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a sectional view of a first variant of a housing adapter flange between transmission unit and generator unit, FIG. 6 shows a sectional view of a second variant of a housing adapter flange between transmission unit and generator unit.

DETAILED DESCRIPTION OF PREFERRED EMBODIMENTS

Figure 1:
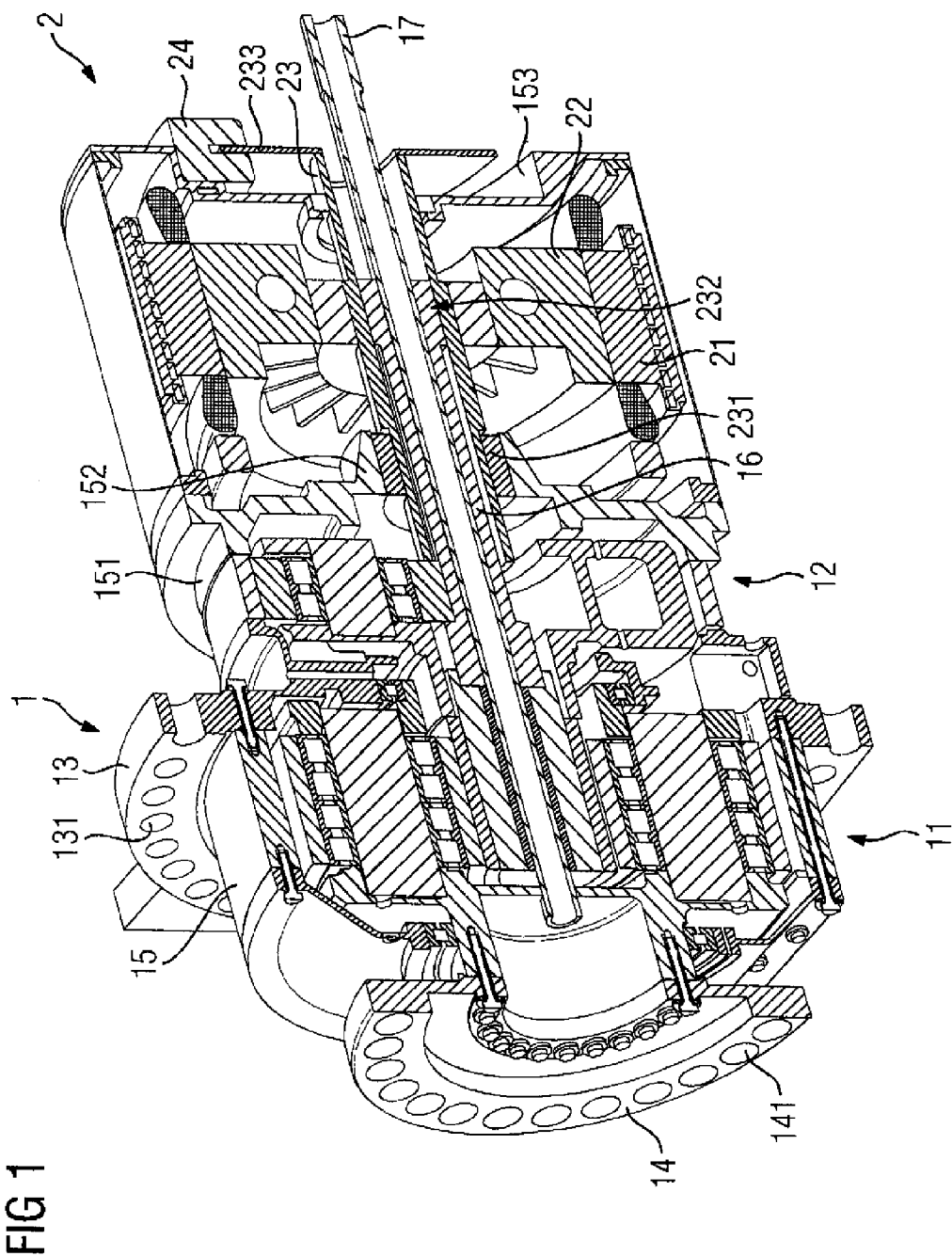
FIG. 1 shows a perspective sectional view of a drive system for a wind turbine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive system for a wind turbine has a transmission unit 1 with a first 11 and second planet wheel stage 12 in a coaxial design. As is also apparent from the sectional view according to FIG. 2, each planet wheel stage 11, 12 includes a hollow wheel 114, 124, several planet wheels 113, 123, a planet carrier 112, 122 and a sun wheel 111, 121. The transmission unit 1 is connected to a generator unit 2 via an output shaft 16 of the transmission unit and is arranged together therewith in a gear case 15. The transmission unit 1 is associated with a drive shaft integrally formed onto the planet carrier 112 of the first planet wheel stage 11, wherein the drive shaft has a coupling flange 14 that can be connected to a rotor shaft and that is mounted above the planet carrier 112 of the first planet wheel stage 11. Two bearings 115 and 116 arranged between planet carrier flanges and gear case 15 are associated with the planet carrier 112 of the first planet wheel stage 11, and represent a first and a second main bearing of the transmission unit 1. Correspondingly, the planet carrier 122 of the second planet wheel stage 12 is mounted by two bearings 125 and 126 arranged between planet carrier flanges and gear case 15.

The generator unit 2 includes a stator 21 and a rotor 22 connected in rotationally fixed manner to a hollow rotor shaft 23. The hollow rotor shaft 23 concentrically surrounds a generator-side end section of the output shaft 16 and is connected thereto via a coupling or clamping connection 232 arranged inside the hollow rotor shaft 23. A gear-case-connecting-piece 152 is arranged between transmission unit 1 and generator unit 2. This housing connecting piece 152 concentrically surrounds a transmission-side end section of the hollow rotor shaft 23 and forms a bearing seat for a bearing arrangement 231 associated with the hollow rotor shaft 23. The output shaft 16 is also mounted by this bearing arrangement 231. In the present exemplary embodiment a pitch tube 17 which extends axially across the entire drive system is arranged inside the output shaft 16 and the hollow rotor shaft 23.

The hollow rotor shaft 23 can for example have an external diameter that increases gradually in the direction of the transmission unit 1. So that the hollow rotor shaft 23 can here also be removed and/or disassembled without dismantling the rotor 22 of the generator unit 2, an internal clamping set 221 is provided in the present exemplary embodiment between the hollow rotor shaft 23 and the rotor 2. The internal clamping set 221 here has a larger external diameter than the hollow rotor shaft 23.

An external diameter of the sun wheel 121 of the second planet wheel stage 12 is advantageously smaller than an internal diameter of the hollow rotor shaft 23. Thus the output shaft 16 and the hollow rotor shaft 23 can be inserted through an opening on a housing cover 153 arranged facing away from the transmission unit 1 and through an opening concentric to the rotor axis on the rotor 2.

Figure 2:
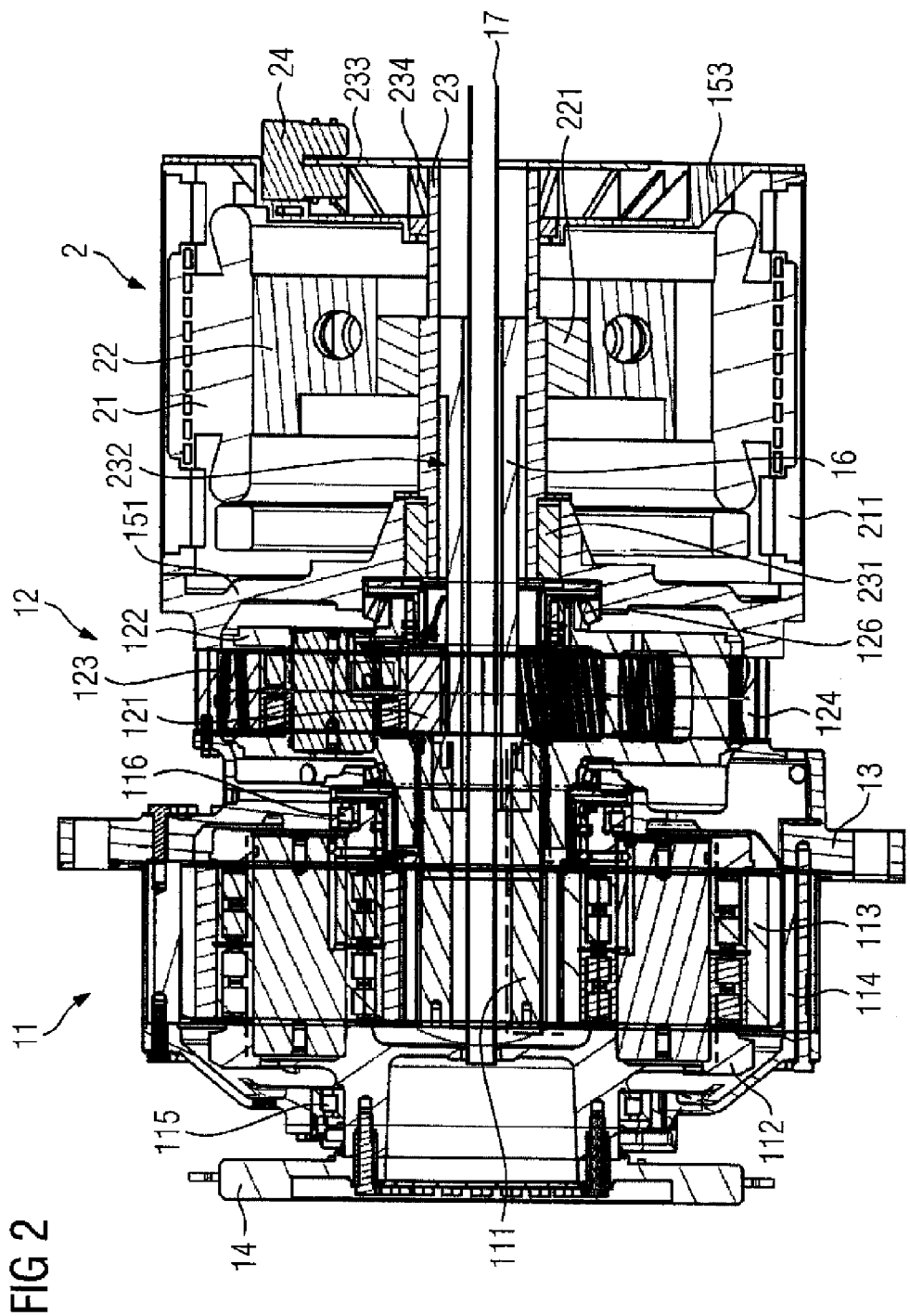
FIG. 2 shows a sectional view of the drive system illustrated in FIG. 1 with transmission unit and generator unit.
Figure 3:
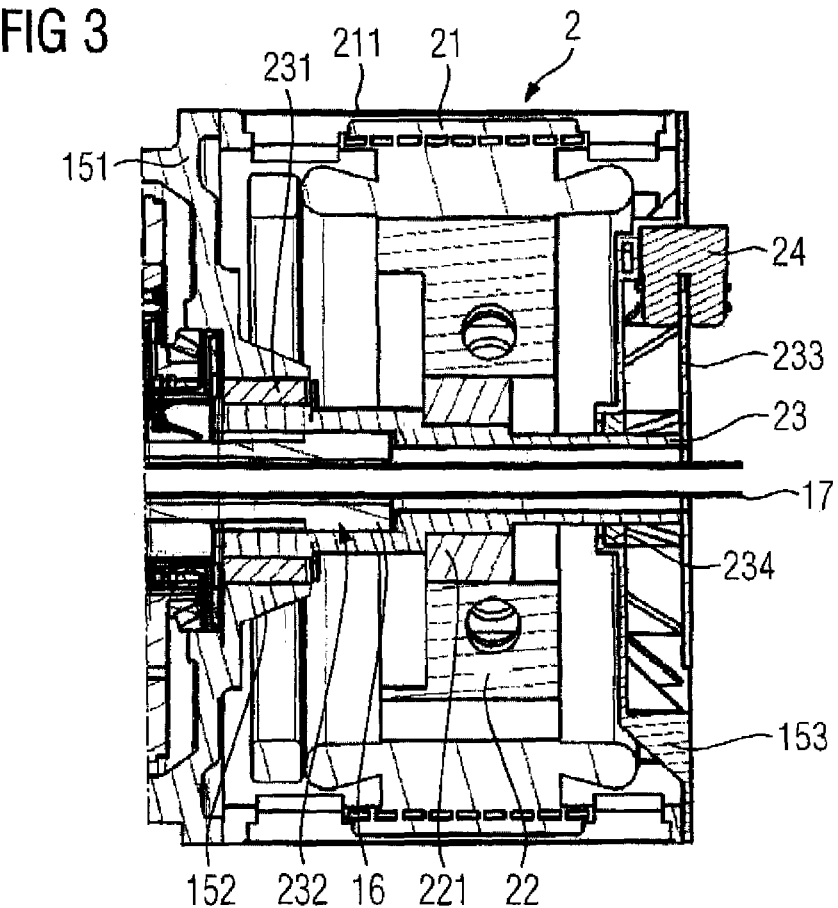
FIG. 3 shows a sectional view of a generator unit of a drive system with a connection between transmission unit and generator unit which is different from that in FIG. 2.

According to the sectional view according to FIG. 2 the coupling or clamping connection 232 on the one hand and the rotor 22 of the generator unit 2 on the other hand are axially aligned to one another and merely have a radial distance from one another. The output shaft 16 of the transmission unit 1 is here approximately half surrounded by the hollow rotor shaft. The bearing arrangement 231 of the hollow rotor shaft 23 arranged on the housing connecting piece 152 is arranged axially centrally between the coupling or clamping connection 232 on the one hand and the sun wheel 121 of the second planet wheel stage 12 on the other hand. Alternatively to the embodiment illustrated in FIG. 2 the coupling or clamping connection 232 according to FIG. 3 can also be arranged axially between the rotor 22 of the generator unit 2 and the bearing arrangement 231 arranged on the housing connecting piece 152. This enables an especially compact design.

The bearing arrangement 231 of the hollow rotor shaft 23 on the housing connecting piece 152 preferably includes a double-row bearing in an X-configuration. In addition the hollow rotor shaft 23 and the output shaft 16 of the transmission unit 1 are according to an especially preferred embodiment mounted solely by the bearing arrangement 231 on the housing connecting piece 152. A rear hollow rotor shaft bearing 234, illustrated in FIGS. 1 to 3, on an end face of the generator unit 2 facing away from the transmission unit 1 is thus not essential and can in principle be omitted.

A brake disk 233 is mounted in rotationally fixed manner on the hollow rotor shaft 23 in the present exemplary embodiment on the end face of the generator unit 2 facing away from the transmission unit 1. The brake disk 233 is thus easy to access for maintenance purposes. A brake caliper 24 associated with the brake disk 233 is attached to the housing cover 153 arranged facing away from the transmission unit 1.

Figure 4:
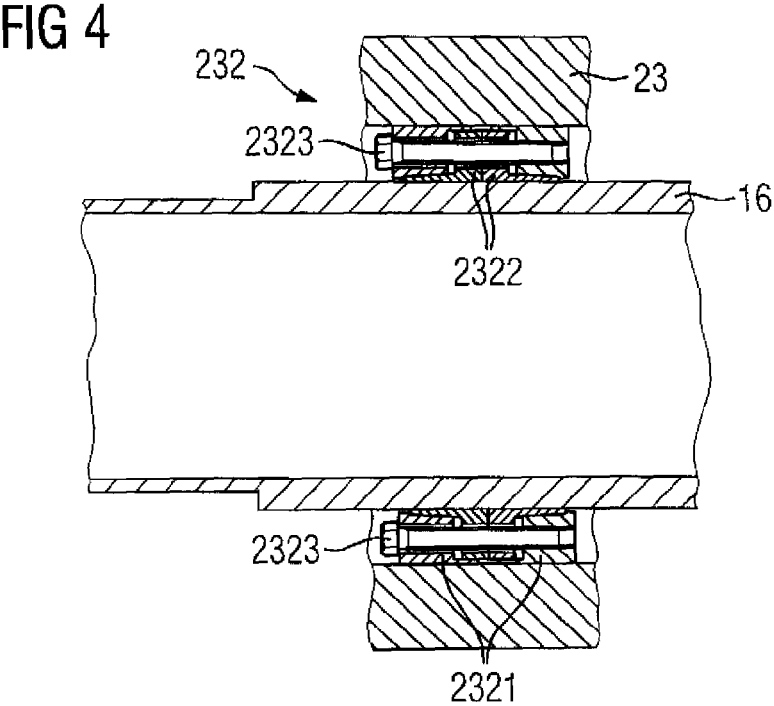
FIG. 4 shows a sectional view of an internal clamping set for connecting the transmission unit to the generator unit.

The hollow rotor shaft 23 can be connected to the output shaft 16 of the transmission unit 1 by a gear coupling with involute or bevel gears. Alternatively the hollow rotor shaft 23 can also be connected to the output shaft 16 of the transmission unit 1 by an internal clamping set 232 illustrated in FIG. 4. The internal clamping set 232 includes in the present exemplary embodiment two outer rings 2321 and two inner rings 2322 which have conical contact surfaces corresponding to one another and can be braced against one another by several axially extending clamping bolts 2323. According to a preferred embodiment, by bracing both the outer rings 2321 and both the inner rings 2322 both the output shaft 16 of the transmission unit 1 and the hollow rotor shaft 23 as well as the hollow rotor shaft 23 and the rotor 22 of the generator unit 2 can be connected to one another, for example in friction-locked manner. The hollow rotor shaft 23 can for example be widened by bracing the outer and inner rings 2321, 2322. This produces a friction-locked connection between hollow rotor shaft 23 and rotor 22. The rotor 22 of the generator unit 2 can for example also be connected to the hollow rotor shaft 23 by a keyway connection, which is axially aligned to the internal clamping set 232.

Alternatively to a gear coupling or to an internal clamping set the hollow rotor shaft 23 can be connected to the output shaft 16 of the transmission unit 1 by an external clamping set. In this case the rotor 22 is for example bolted to a flange of the external clamping set and is connected to the hollow rotor shaft 23 via this. Advantageously a flange is provided when using an external clamping set on the motor-side or generator-side end section of the second shaft 16 of the transmission unit 1.

The housing connecting piece 152 concentrically surrounding the bearing arrangement 231 of the hollow rotor shaft 23 is in the present exemplary embodiment integrally formed onto a housing adapter flange 151 arranged between transmission unit 1 and generator unit 2. Both a stator housing 211 of the generator unit 2 and the hollow wheel 124 of the second planet wheel stage 12 are mounted on the housing adapter flange 151. Additionally the housing adapter flange 151 has a bearing seat for a generator-side planet carrier bearing 126 of the second planet wheel stage 12.

According to FIG. 5 the housing adapter flange 151 in each case has a flange extension 1511, 1512, on which the stator housing 211 or the hollow wheel 124 of the second planet wheel stage 12 is mounted. FIG. 6 illustrates a variant of a housing adapter flange 151, in which the flange extension 1512 associated with the stator housing 211 and the flange extension 1511 associated with the hollow wheel 124 are spaced axially apart from one another.

The gear case 15 has a full cardanic circumferentially symmetrical or partially symmetrical suspension 13 for connection to a structural support element of the wind turbine. This structural support element is for example a frame or a nacelle of the wind turbine.

The second planet wheel stage 12 is dimensioned such in respect of its speed ratio that when selecting a number of generator poles divisible by 3 as well as with an optimal design for rated speed, essentially identical external diameters of the stator of the generator unit 2 and hollow wheel 124 of the second planet wheel stage 12 are produced. Generator-side bearings of the transmission unit 1 are designed to be electrically insulating. Thus a flow of current from the transmission unit 1 into a rotor of the generator unit 2 can be prevented.

Because of the full cardanic suspension of the drive system in combination with freedom from transverse and radial forces and a two-point or torsional mounting of the drive system a drive train is produced to which only torsion is still applied. Because of a housing-side combination of transmission unit 1 and generator unit 2, utilizing their high level of rigidity, at least a significant reduction of constraining forces in the drive train can be achieved despite significantly fewer rigid bearing elements in the cardanic suspension.

By combining the two-point or torsional mounting of the drive system with the full cardanic suspension of the gear case 15 also surrounding the generator unit 2 a coupling arranged between transmission unit 1 and generator unit 2 is subject to significantly less stress. This coupling can hence be designed to be considerably more rigid. This in turn offers further advantages in respect of operating dynamics.

An embodiment of the main bearings of the transmission unit 1 can further be achieved without taking account of bearings of downstream components. As a result it is possible to use torsional bearings, which require only significantly less installation space, for the main bearings of the transmission unit 1 in a technically feasible form for large drives. In addition a torsion-related shaft alignment transposition has inventively become irrelevant to damage for the transmission unit 1 because of the full cardanic suspension.

Figure 7:
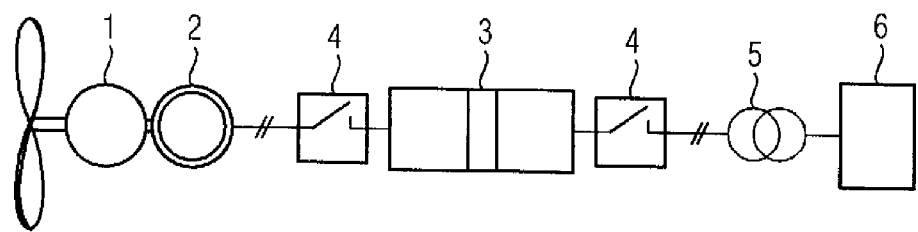
FIG. 7 shows a diagrammatic illustration of a drive system for a wind turbine including power link.

In the present exemplary embodiment 3 the generator unit 2 has independent winding systems which are connected to a full-power converter 3 illustrated in FIG. 7. The full-power converter 3 enables dynamic grid decoupling and is connected to the generator unit 2 via reversing switch-disconnectors 4 on the one hand as well as to a transformer 5 for injecting power into an energy supply grid 6 on the other hand. In addition, separately insulated generator windings are provided for each pole. Furthermore, the three independent winding systems are interconnected outside the gear case 15 surrounding the generator unit 2. The generator unit is designed to be 9- to 30-pole, preferably 12- to 24-pole.

Figure 8:
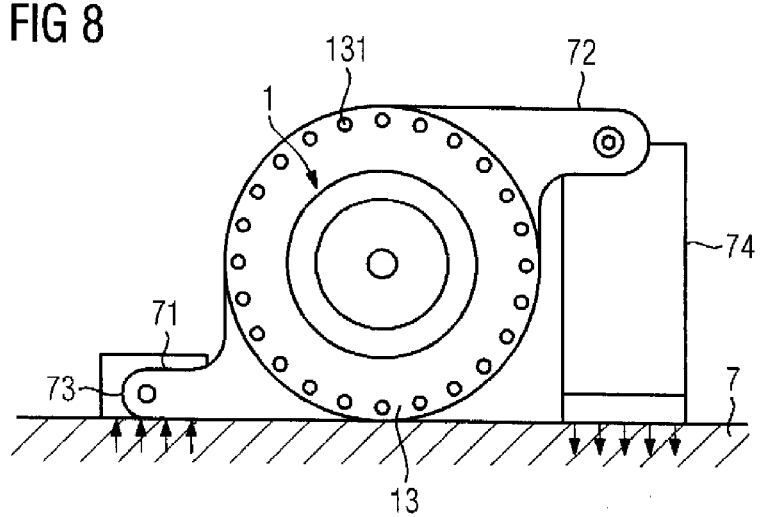
FIG. 8 shows a support ring for full cardanic suspension of the drive system according to FIG. 1 with a corresponding two-arm torque bracket.

According to the exemplary embodiment illustrated in FIG. 8 the full cardanic suspension 13 is formed by a support ring radially and fully circumferentially surrounding the gear case 15. The support ring 13 has several through-holes 131 arranged essentially equidistantly in the circumferential direction, into each of which is inserted a first end section of elastic bolts. The elastic bolts are connected to a corresponding torque bracket on the structural support element 7 of the wind turbine. The corresponding torque bracket likewise includes a ring element with through-holes arranged essentially equidistantly in the circumferential direction, into which a second end section of the elastic bolts is inserted. Additionally the corresponding torque bracket has in accordance with the exemplary embodiment illustrated in FIG. 8 two asymmetrically formed support arms 71, 72, the end section of each of which is inserted into a receptacle 73, 74 on the structural support element 7 and is there connected thereto.

The elastic bolts of the full cardanic suspension 13 are axially removable elastomer bolts. In accordance with FIG. 1 the coupling flange 14 also has several through-holes 141 arranged essentially equidistantly in the circumferential direction, into which axially removable elastomer bolts which are connected to a corresponding rotor shaft coupling flange are inserted. A direction of removal or installation of the drive system which is radial in respect of a shaft arrangement of the transmission unit 1 has been approved for disassembled elastomer bolts of the full cardanic suspension 13 and of the coupling flange 14.

Add-on units for the transmission unit 1, for example oil system, cooler and hydraulics, are advantageously mounted directly on the structural support element 7 of the wind turbine. By the full cardanic suspension 13 as well as a flexible coupling between rotor shaft and drive shaft of the transmission unit 1 the add-on units are thus decoupled from the gear case 15.

Figure 9:
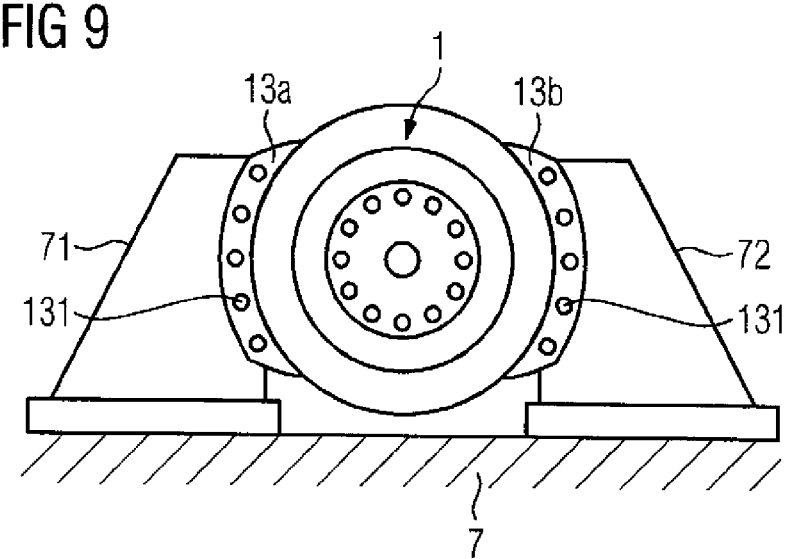
FIG. 9 shows two ring segment supports for full cardanic suspension of the drive system according to FIG. 1 with corresponding torque brackets.
Figure 10:
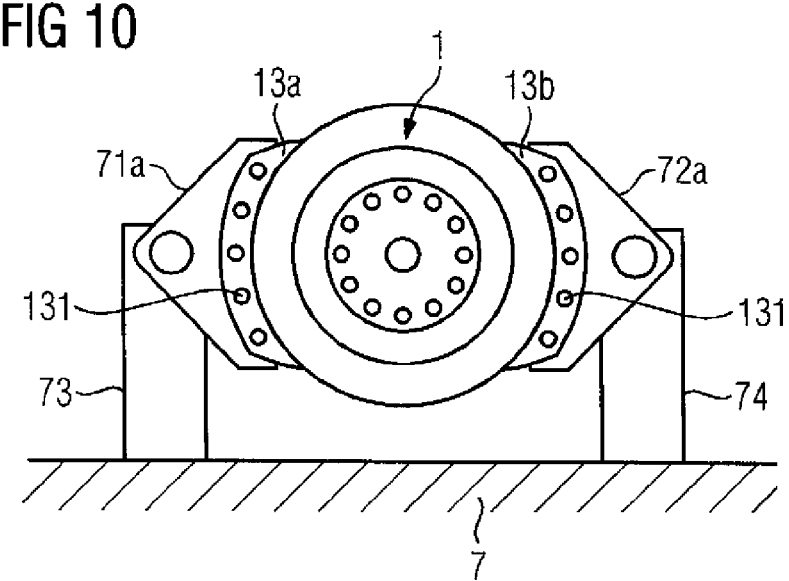
FIG. 10 shows two ring segment supports in a variant modified compared to FIG. 9.

Illustrated in each of FIGS. 9 and 10 are two ring segment supports 13a, 13b for partial circumferential full cardanic suspension of the drive system. The ring segment supports 13a, 13b each have several through-holes 131 arranged essentially equidistantly in the circumferential direction, into which the elastic bolts are inserted. Additionally the elastic bolts are connected to corresponding torque brackets 71, 72 on the structural support element 7 of the wind turbine. According to the exemplary embodiment illustrated in FIG. 9 the corresponding torque brackets 71, 72 are attached directly on the structural support element 7 of the wind turbine. In contrast, in accordance with the exemplary embodiment illustrated in FIG. 10, each of the corresponding torque brackets includes a support arm 71a, 72a, an end section of which is inserted into a receptacle 73, 74 on the structural support element and is there connected thereto. Thus installation in the manner of a conventional two-arm support is retained, without the need to adapt the main frame to the wind turbine for this purpose. As there are already no constraining forces, known elastomer bearings can be used, which are preferably designed fully in accordance with vibration-damping criteria.

Both in the case of the exemplary embodiment illustrated in FIG. 9 and in the case of the exemplary embodiment illustrated in FIG. 10 the corresponding torque brackets on the structural support element 7 each include a ring segment with through-holes arranged essentially equidistantly 131 in the circumferential direction. Into these through-holes 131 the elastic bolts are inserted, which as with the exemplary embodiment in accordance with FIG. 8 can also be designed as axially removable elastomer bolts. Preferably the symmetrical axis of the torque brackets and the rotational axis of the drive system intersect.

In addition the coupling flange according to a further embodiment can have several rows of through-holes offset in respect of one another, into the through-holes of which axially removable elastomer bolts are inserted. As a result the external diameter of the coupling flange can be made smaller, while retaining the same spacings between through-holes.

Furthermore, the elastomer bolts can have different rigidities adapted according to diameter and flange type. In particular the coupling flange with a smaller diameter compared to the suspension can be made of a harder material, while the suspension can be manufactured from a softer material.

The use of the drive system described is not just restricted to wind turbines, but is also conceivable for example in mill drive systems in which the generator unit is replaced by a motor unit.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive system for a wind turbine comprising:
   a transmission unit with at least one planet wheel stage comprising a hollow wheel, several planet wheels, a planet carrier and a sun wheel,
   first shaft associated with the transmission unit and comprising a coupling flange which is mounted above the planet carrier and configured for connection to a driven machine shaft or rotor shaft,
   a gear case surrounding the transmission unit and a motor unit or generator unit connected to a second shaft of the transmission unit having a motor-side or generator-side end section,
   a rotor of the motor unit or the generator unit, connected with a rotation lock to a hollow rotor shaft which concentrically surrounds the motor-side or generator-side end section and is connected to the motor-side or generator-side end section via a coupling or clamping connection arranged inside the hollow rotor shaft, and
   a gear-case-connecting-piece which is arranged between the transmission unit and the motor unit or generator unit and concentrically surrounds a transmission-side end section of the hollow rotor shaft and forms a bearing seat for a bearing arrangement associated with the hollow rotor shaft, with the bearing seat also supporting the second shaft of the transmission unit.

2. The drive system of claim 1, further comprising a gear coupling with involute or bevel gears connecting the hollow rotor shaft to the second shaft of the transmission unit.

3. The drive system of claim 1, wherein the coupling or clamping connection connects the hollow rotor shaft to the second shaft of the transmission unit.

4. The drive system of claim 3, wherein the coupling or clamping connection comprises at least one outer ring and at least one inner ring having corresponding conical contact surfaces which are constructed to be tensioned against one another with several axially extending clamping bolts.

5. The drive system of claim 4, wherein the second shaft of the transmission unit and the hollow rotor shaft as well as the hollow rotor shaft and the rotor of the motor unit or the generator unit are connected with each other when the conical contact surfaces are tensioned against one another.

6. The drive system of claim 5, wherein the rotor of the motor unit or the rotor of the generator unit is connected to the hollow rotor shaft by a keyway connection which is oriented axially on the internal clamping set.

7. The drive system of claim 5, wherein the second shaft of the transmission unit and the hollow rotor shaft as well as the hollow rotor shaft and the rotor of the motor unit or of the generator unit are connected to one another with a friction-lock.

8. The drive system of claim 1, further comprising an external clamping set, wherein the second shaft of the transmission unit comprises a flange disposed on the motor-side or generator-side end section, and wherein the hollow rotor shaft is connected to the second shaft of the transmission unit by the external clamping set.

9. The drive system of claim 8, wherein the rotor of the motor unit or of the generator unit is bolted to a flange of the external clamping set and is connected to the hollow rotor shaft via the flange of the external clamping set.

10. The drive system of claim 4, wherein the coupling or clamping connection and the rotor of the motor unit or of the generator unit are axially aligned relative to one another and have only a radial gap therebetween.

11. The drive system of claim 10, wherein substantially half the second shaft of the transmission unit is axially surrounded by the hollow rotor shaft.

12. The drive system of claim 10, wherein the bearing arrangement of the hollow rotor shaft is arranged axially centrally between the coupling or clamping connection and a sun wheel which is connected to the second shaft of the transmission unit with a rotation-lock.

13. The drive system of claim 4, wherein the coupling or clamping connection is arranged axially between the rotor of the motor unit or of the generator unit and the bearing arrangement of the hollow rotor shaft.

14. The drive system of claim 1, wherein the bearing arrangement of the hollow rotor shaft on the gear-case-connecting-piece comprises a double-row bearing in an X-configuration.

15. The drive system of claim 1, wherein the hollow rotor shaft and the second shaft of the transmission unit are mounted on the gear-case-connecting-piece substantially exclusively by the bearing arrangement.

16. The drive system of claim 1, wherein the hollow rotor shaft has an external diameter which increases gradually towards the transmission unit.

17. The drive system of claim 1, wherein the gear-case-connecting-piece is integrally formed onto a housing adapter flange arranged between the transmission unit and the motor unit or generator unit.

18. The drive system of claim 17, wherein the housing adapter flange comprises a bearing seat for a motor-side or a generator-side planet carrier bearing.

19. The drive system of claim 17, wherein a stator casing of the motor unit or generator unit is mounted on the housing adapter flange.

20. The drive system of claim 17, wherein a hollow wheel of the at least one motor-side or generator-side planet wheel stage is mounted on the housing adapter flange.

21. The drive system of claim 17, wherein the housing adapter flange has a flange extension on which a stator housing of the motor unit or generator unit, or a hollow wheel of the at least one motor-side or generator-side planet wheel stage are mounted.

22. The drive system of claim 21, wherein the flange extension associated with the stator housing and the flange extension associated with the hollow wheel are axially spaced apart from one another.

23. The drive system of claim 1, wherein an external diameter of a sun wheel connected to the second shaft of the transmission unit is smaller than an internal diameter of the hollow rotor shaft.

24. The drive system of claim 23, wherein the second shaft of the transmission unit and the hollow rotor shaft can be inserted through an opening on a housing cover arranged facing away from the transmission unit and through an opening on the rotor concentric to the rotor axis.

25. The drive system of claim 1, wherein the first shaft of the transmission unit comprises a coupling flange which can be flexibly connected to the driven machine shaft or rotor shaft, and wherein the gear case comprises a cardanic circumferentially symmetrical or partially symmetrical suspension for connection to a structural support element of the wind turbine.

26. The drive system of claim 25, wherein the cardanic suspension is formed by a support ring which completely circumferentially radially surrounds the gear case and which has several through-holes arranged substantially equidistantly in the circumferential direction, into which elastic bolts are inserted which can be connected to a corresponding torque bracket on the structural support element of the wind turbine.

27. The drive system of claim 26, wherein the corresponding torque bracket comprises a ring element with through-holes arranged substantially equidistantly in the circumferential direction, into which the elastic bolts can be inserted.

28. The drive system of claim 27, wherein the corresponding torque bracket comprises two symmetrically or asymmetrically formed on support arms, wherein an end section of each support arm can be inserted into and connected with a receptacle on the structural support element.

29. The drive system of claim 25, wherein the cardanic suspension is formed by two ring segment supports which radially surround the gear case partially in the circumferential direction, with each of the ring segment supports having several through-holes substantially equidistantly arranged in the circumferential direction, into which elastic bolts can be inserted which can be connected to corresponding torque brackets on the structural support element of the wind turbine.

30. The drive system of claim 29, wherein each of the torque brackets comprises a ring segment with through-holes arranged substantially equidistantly in the circumferential direction, into which through-holes the elastic bolts can be inserted.

31. The drive system of claim 30, wherein each of the corresponding torque brackets comprises a support arm having an end section which can be inserted into and connected to a receptacle on the structural support element.

32. The drive system of claim 26, wherein the elastic bolts of the cardanic suspension are axially removable elastomer bolts, and wherein the coupling flange has several through-holes arranged substantially equidistantly in the circumferential direction, into which through-holes axially removable elastomer bolts are inserted for connection to a corresponding driven machine shaft or rotor shaft coupling flange.

33. The drive system of claim 32, wherein when the elastomer bolts of the cardanic suspension and the coupling flange are removed, the drive system has an unobstructed radial removal and/or installation direction with respect of a shaft arrangement of the transmission unit.

34. The drive system of claim 25, wherein add-on units of the transmission unit are mounted directly on the structural support element of the wind turbine and are decoupled from the gear case by the cardanic suspension as well as by a flexible coupling between driven machine shaft or rotor shaft and the first shaft of the transmission unit.

35. The drive system of one of claim 25, wherein the transmission unit comprises a first main bearing and a second main bearing arranged between planet carrier flanges and the gear case and constructed to support the first shaft of the transmission unit.

36. The drive system of claim 25, wherein the transmission unit comprises coaxially arranged first and second planet wheel stages.

37. The drive system of claim 1, further comprising a brake disk connected to the hollow rotor shaft with a rotation lock.

38. The drive system of claim 37, wherein the brake disk is arranged on an end face of the motor unit or generator unit facing away from the transmission unit.

39. The drive system of claim 1, wherein motor-side or generator-side bearings of the transmission unit are constructed to be electrically insulating.

40. The drive system of claim 1, wherein the transmission unit is connected to a generator unit, and wherein the first shaft of the transmission unit is a transmission-side drive shaft, and wherein the second shaft of the generator unit is a transmission-side output shaft, and wherein the coupling flange of the transmission-side drive shaft is configured for connection to a rotor shaft.

* * * * *